(12) United States Patent
Choi

(10) Patent No.: US 7,804,080 B2
(45) Date of Patent: Sep. 28, 2010

(54) MOISTURE REMOVAL APPARATUS AND METHOD OF IMAGE READ OUT APPARATUS

(75) Inventor: Kyung-Chool Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1560 days.

(21) Appl. No.: 11/110,895

(22) Filed: Apr. 21, 2005

(65) Prior Publication Data

US 2005/0286092 A1 Dec. 29, 2005

(30) Foreign Application Priority Data

Jun. 25, 2004 (KR) .................... 10-2004-0048563

(51) Int. Cl.
*H04N 1/04* (2006.01)
*H01L 27/00* (2006.01)
(52) U.S. Cl. .................. 250/573; 340/602; 358/296
(58) Field of Classification Search ............... 250/573; 340/602; 358/296
See application file for complete search history.

(56) References Cited

U.S. PATENT DOCUMENTS 4,905,092 A 2/1990 Koshiishi et al.
6,621,218 B1 * 9/2003 Matsumoto ............... 358/482

FOREIGN PATENT DOCUMENTS

| CN | 1120686 | 4/1996 |
|---|---|---|
| JP | 02-018577 | 1/1990 |
| JP | 7244342 | 9/1995 |
| JP | 09-055828 | 2/1997 |
| JP | 11-272149 | 10/1999 |
| JP | 2002-040907 | 2/2002 |
| JP | 2003-18340 | 1/2003 |
| JP | 2003-322918 | 11/2003 |

OTHER PUBLICATIONS

Chinese Office Action dated Dec. 14, 2007 issued in CN 200510077874.8.
Korean Office Action dated Jan. 24, 2006 issued in KR 2004-48563.

* cited by examiner

*Primary Examiner*—Seung C Sohn
(74) *Attorney, Agent, or Firm*—Stanzione & Kim, LLP

(57) ABSTRACT

A moisture removal apparatus and method of an image read-out apparatus, in which the image read-out apparatus includes a contact image sensor (CIS) provided with a document glass on which a document is put on an upper portion thereof and a read-out unit to read out an image of the document, and a pressing roller rotatably provided in contact with a top surface of the CIS to press and transfer the document. The moisture removal apparatus includes a heater to heat the document glass at a predetermined temperature to remove moisture, a power source to apply a predetermined voltage to the heater, a sensing unit to provide basic information to determine driving conditions of the heater, and a controller to control heating conditions of the heater on the basis of the information received from the sensing unit. Thereby, the moisture on the top surface of the document glass may be effectively removed.

41 Claims, 8 Drawing Sheets

MOISTURE REMOVAL APPARATUS AND METHOD OF IMAGE READ OUT APPARATUS

CROSS-REFERENCE TO RELATED APPLICATIONS

This application claims the benefit under 35 U.S.C. §119 of Korean Patent Application No. 2004-48563 filed on Jun. 25, 2004, the disclosure of which is hereby incorporated herein by reference and in its entirety.

BACKGROUND OF THE INVENTION

1. Field of the Invention

The present general inventive concept relates to a moisture removal apparatus and method of an image read out apparatus, and more particularly, to a moisture removal apparatus and method of an image read out apparatus, in which the moisture is prevented from forming on an upper surface of a contact image sensor (CIS), to thereby decrease a paper transfer error.

2. Description of the Related Art

Recently, terminals such as a facsimile, a printer, a copier, a scanner, etc., independently used as office equipment, have been incorporated into a multi-function terminal, such as a multi-function peripheral (MFP).

Such an MFP should read out a document prior to copying the document. A method of reading out the document in the MFP is classified into a contact image sensor (CIS) type and a charged couple device (CCD) type according to an arrangement of a read out element. In the CCD type, pixels read out by a light source (e.g., a fluorescent lamp or a light emitting diode (LED)) corresponding to one line are concentrated through a mirror or lens, and thus thousands of read out elements corresponding to one line are converted into electrical signals through the CCD. In the CIS type, a light source (usually LED) and a read out sensor are integrated into one, and then brought into contact with a document to read out the document. Recently, the CIS type has been widely used.

Such a CIS is disclosed in U.S. Pat. No. 5,214,273 (issued on May 25, 1993).

In this disclosure, there is a main frame, over which a glass cover is covered. The main frame is provided with a light source, which emits light toward the glass cover. A rod lens array is provided on one side of the light source and condenses the light which is emitted from the light source and reflected from a predetermined position of the glass cover. A photo converter element is provided under the rod lens array and receives the condensed light.

Further, a document read-out apparatus employing this CIS is disclosed in Japanese publication No. 09-55828, published on Feb. 25, 1997.

This document read-out apparatus includes a CIS, a CIS roller contacting a document glass and transferring a document in contact with the document glass, a motor driving the CIS roller to operate, and so forth.

In such a document read-out apparatus, the surface of the document glass may become damp due to an ambient temperature difference. When moisture forms on the document glass, a problem occurs in which the document paper adheres to the document glass, and thereby fails to be transferred.

Particularly, photo paper having minute surface roughness has been recently used for photoprinting or to print a high resolution image such as a photo image. However, the photo paper adheres to the moist document glass more easily, and thus fails to be transferred.

SUMMARY OF THE INVENTION

The present general inventive concept provides a moisture removal apparatus to be used with an image read-out apparatus, in which moisture is prevented from forming on a document glass of a contact image sensor (CIS), to thereby allow paper to be smoothly transferred.

The present general inventive concept also provides a moisture removal method of an image read-out apparatus.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept are achieved by providing a moisture removal apparatus to be used with an image read-out apparatus, in which the image read-out apparatus includes a contact image sensor (CIS) provided with a document glass on which a document is put on an upper portion thereof and a read-out unit to read out an image of the document is provided an inner portion thereof, and a pressing roller rotatably provided in contact with a top surface of the CIS to transfer the document, the moisture removal apparatus including a heater to heat the document glass at a predetermined temperature to remove moisture, a power source to apply a predetermined voltage to the heater, a sensing unit to provide basic information to determine driving conditions of the heater, and a controller to control heating conditions of the heater according to the information received from the sensing unit.

The heater may be provided in the document glass, and can be coated on an inner surface of the document glass. Alternatively, the heater may be provided in the pressing roller.

The sensing unit may include a room temperature sensor which can be mounted to the image read-out apparatus to sense a room temperature to determine the driving conditions of the heater, a humidity sensor to sense humidity of a surface of the document glass to determine the driving conditions of the heater, and a temperature sensor to sense temperature of the document glass to determine the driving conditions of the heater.

The temperature sensor can check whether the temperature of the document glass of the CIS exceeds a driving temperature. Further, the temperature sensor can sense a surface temperature of the document glass.

The moisture removal apparatus may further include a document sensor which is provided to a document feeder of the image read-out apparatus to sense whether the document is fed into the document feeder.

The foregoing and/or other aspects and advantages of the present general inventive concept may also be achieved by providing a method of removing moisture of an image read-out apparatus, the method including sensing whether a document is fed into a document feeder, sensing a humidity of a top surface of a document glass of a CIS, determining driving conditions of a heater to heat the document glass according to the sensed humidity, and driving the heater on the basis of the driving conditions to remove moisture.

The driving conditions of the heater may be given by tabulating a target temperature to drive the heater according to the sensed humidity. Further, the driving conditions of the heater may include keeping the heater substantially at the target temperature for a predetermined amount of time when the heater reaches the target temperature.

The method may further include rechecking the humidity of the top surface of the document glass after removing the moisture to determine the driving conditions of the heater to heat the document glass according to the rechecked humidity when the rechecked humidity exceeds a reference humidity, and driving the heater according to the driving conditions to repeatedly remove the moisture.

The method may further include checking the temperature of the CIS after removing the moisture and cooling the CIS to a driving temperature when the checked temperature is greater than the driving temperature of the CIS.

The foregoing and/or other aspects and advantages of the present general inventive concept may also be achieved by providing a moisture removal method of an image read-out apparatus, the method including sensing whether a document is fed into a document feeder, sensing a room temperature at the image read-out apparatus, determining driving conditions of a heater to heat a document glass of a CIS according to the sensed room temperature, and driving the heater according to the driving conditions to remove moisture.

The driving conditions of the heater may be given by tabulating a target temperature to remove the moisture according to the sensed room temperature. Further, the driving conditions of the heater may include keeping the heater substantially at the target temperature for a predetermined amount of time when the heater reaches the target temperature.

The method may further include checking the temperature of the CIS after removing the moisture, and cooling the CIS to a driving temperature when the checked temperature is greater than the driving temperature of the CIS.

The foregoing and/or other aspects and advantages of the present general inventive concept may also be achieved by providing a moisture removal method of an image read-out apparatus, the method including sensing whether a document is fed into a document feeder, sensing a surface temperature of a document glass of a CIS through a temperature sensor, driving a heater until the heater reaches a predetermined target temperature corresponding to the sensed temperature, and checking whether the heater reaches the target temperature.

The driving conditions of the heater may include keeping the heater substantially at the target temperature for a predetermined amount of time when the heater reaches the target temperature.

The method may further include checking the temperature of the CIS after removing the moisture, and cooling the CIS to a driving temperature when the checked temperature is greater than the driving temperature of the CIS.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
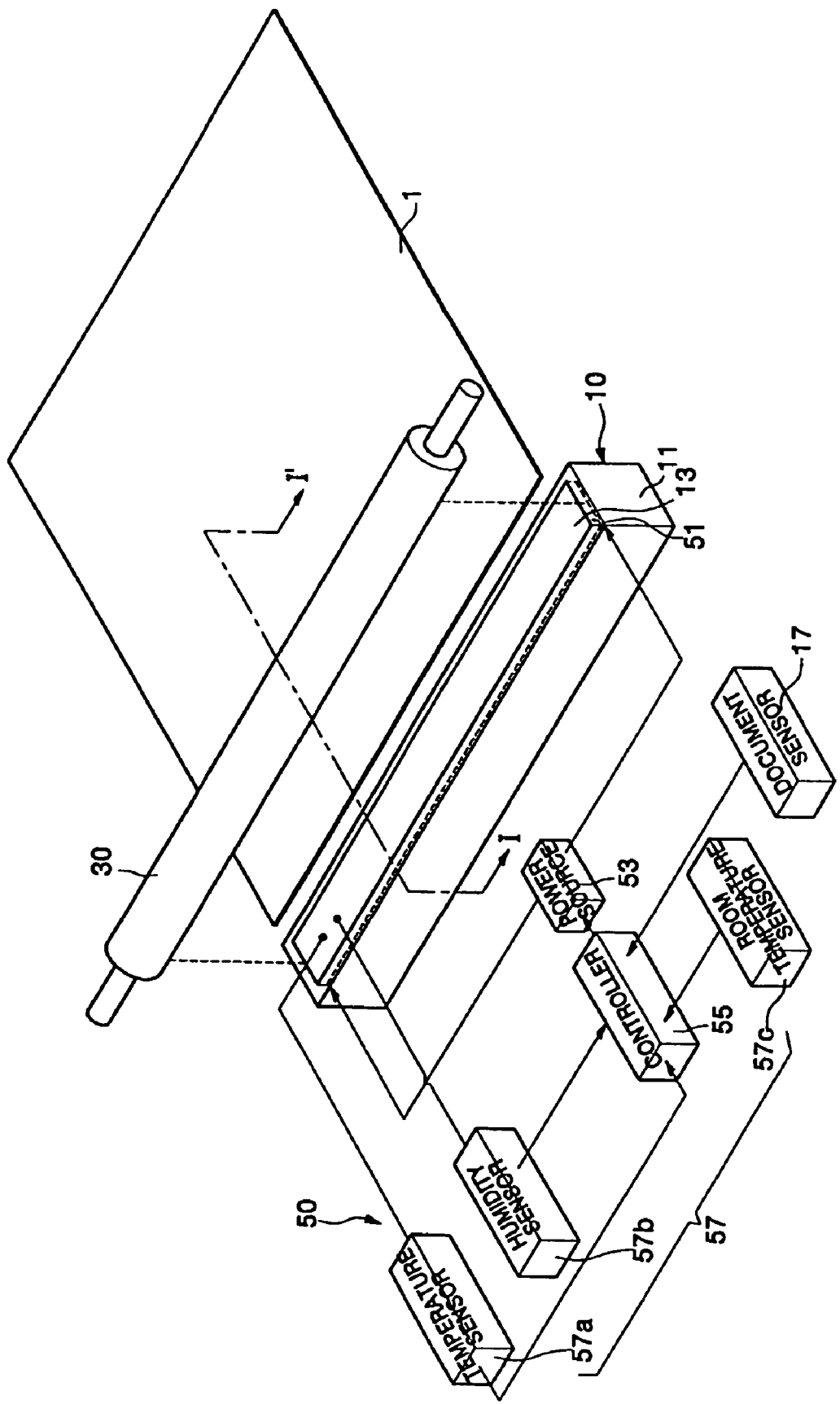
FIG. 1 is a perspective view illustrating an image read-out apparatus with a moisture removal apparatus according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 2:
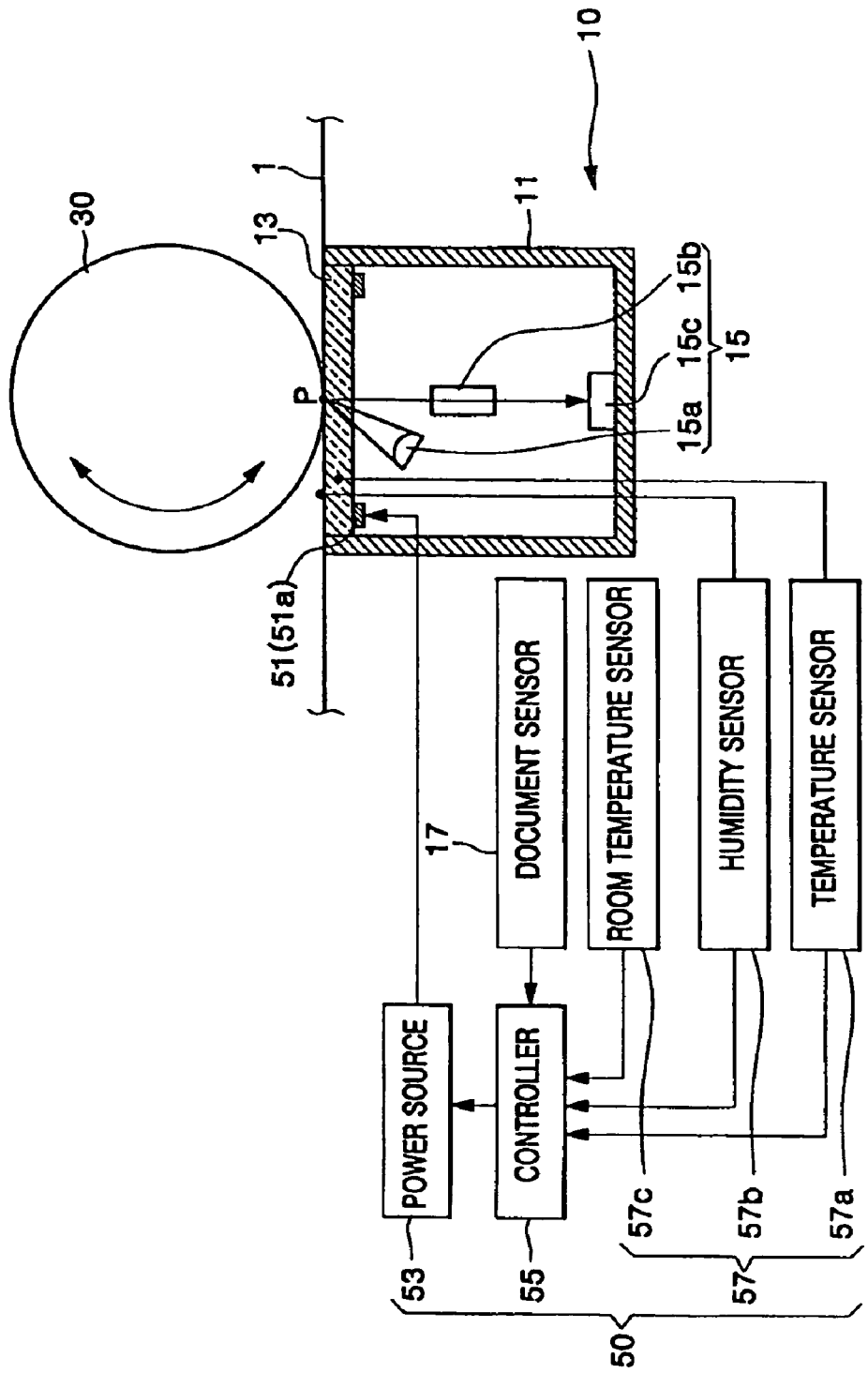
FIG. 2 is a cross-sectional view illustrating the image read-out apparatus of FIG. 1, taken along a line I-I'.

FIG. 1 is a perspective view illustrating an image read-out apparatus according to an embodiment of the present general inventive concept, and FIG. 2 is a cross-sectional view taken along a line I-I' of FIG. 1.

Referring to FIG. 1, the image read-out apparatus may include a contact image sensor (CIS) 10 to read out an image of a document 1. A pressing roller 30 can be rotatably provided in contact with an upper surface of the CIS 10 so as to transfer the document 1. A moisture removal unit 50 is provided on the upper surface of the CIS 10 to prevent moisture from being formed on the upper surface of the CIS 10 due to an ambient temperature difference. In addition, the image read-out apparatus may include a document sensor 17 to sense whether the document 1 is fed into a document feeder (not shown). Here, the document sensor 17 can sense the document 1 standing by the document feeder (not shown) rather than the document 1 placed on the CIS 10. Hence, the moisture removal unit 50 can be prevented from unnecessarily operating in a state in which the document 1 is not ready to be fed.

Referring to FIGS. 1 and 2, the CIS 10 may include a main frame 11, a document glass 13 covering an upper side of the main frame 11, and a read-out unit 15 to read out an image of the document 1 placed on the document glass 13.

The read-out unit 15 may include a light source 15a to emit light toward the document glass 13, a lens array 15b provided on one side of the light source 15a to condense the light emitted from the light source and reflected from a predetermined position P of the document 1, and a photo converter element 15c provided under the lens array 15b to form the condensed light into an image. Here, information on the document 1 can be detected by the photo converter element 15c and converted into an image signal as an analog signal. Thus, the read-out unit 15 can read out the information on the document 1.

The moisture removal unit 50 heats the document glass 13 at a predetermined temperature and removes the moisture from a surface of the document glass 13. The moisture removal unit 50 can include a heater 51 provided in the document glass 13 to heat the document glass 13 at a predetermined temperature, a power source 53 to apply a predetermined voltage to the heater 51, a sensing unit 57 to sense the moisture of the document glass 13 and to provide guidance in a selection of conditions to drive the heater 51, and a controller 55 to determine driving conditions of the heater 51 according to information received from the sensing unit 57 and to transmit a driving signal to the heater 51.

The sensing unit 57 may include various devices, such as a temperature sensor 57a to sense a surface temperature of the document glass 13 of the CIS 10, a humidity sensor 57b to sense humidity of the surface of the document glass 13 of the CIS 10, and a room temperature sensor 57c to sense an ambient room temperature. The room temperature sensor 57c can be mounted to the image read-out apparatus in which the CIS 10 is provided.

Therefore, the driving conditions of the heater 51 can be determined on the basis of information sensed by the temperature sensor 57a, the humidity sensor 57b, or the room temperature sensor 57c, and thus the heater 51 can be driven to remove the moisture, which will be described in detail below.

Meanwhile, in a state in which the temperature of the CIS 10 exceeds a driving temperature while the heater 51 generates heat to remove the moisture, the CIS 10 may not be driven. Therefore, it can be required to check the driving temperature of the CIS 10. At this time, the temperature sensor 57a can sense whether the CIS 10 maintains the driving temperature. If the temperature of the CIS 10 exceeds the driving temperature, the CIS 10 can experience cooling until its temperature arrives at the driving temperature. For example, the temperature satisfying the conditions to drive the CIS 10 can range from about 15° C. to about 35° C. Further, the temperature sensor 57a checks the temperature of the document glass 13, and then not only can provide information to determine a quantity of the heat generated from the heater 51, but also can check whether the CIS 10 maintains the driving temperature. Further, the temperature sensor 57a can check the surface temperature of the document glass 13.

Hereinafter, a configuration of the heater 51 will be described in more detail.

The heater 51 may include an opaque heater 51a coated on an inner surface of the document glass 13. Here, the opaque heater 51a can be placed, for example, on an edge of the document glass 13 so as not to interfere with the read-out unit 15.

Figure 3:
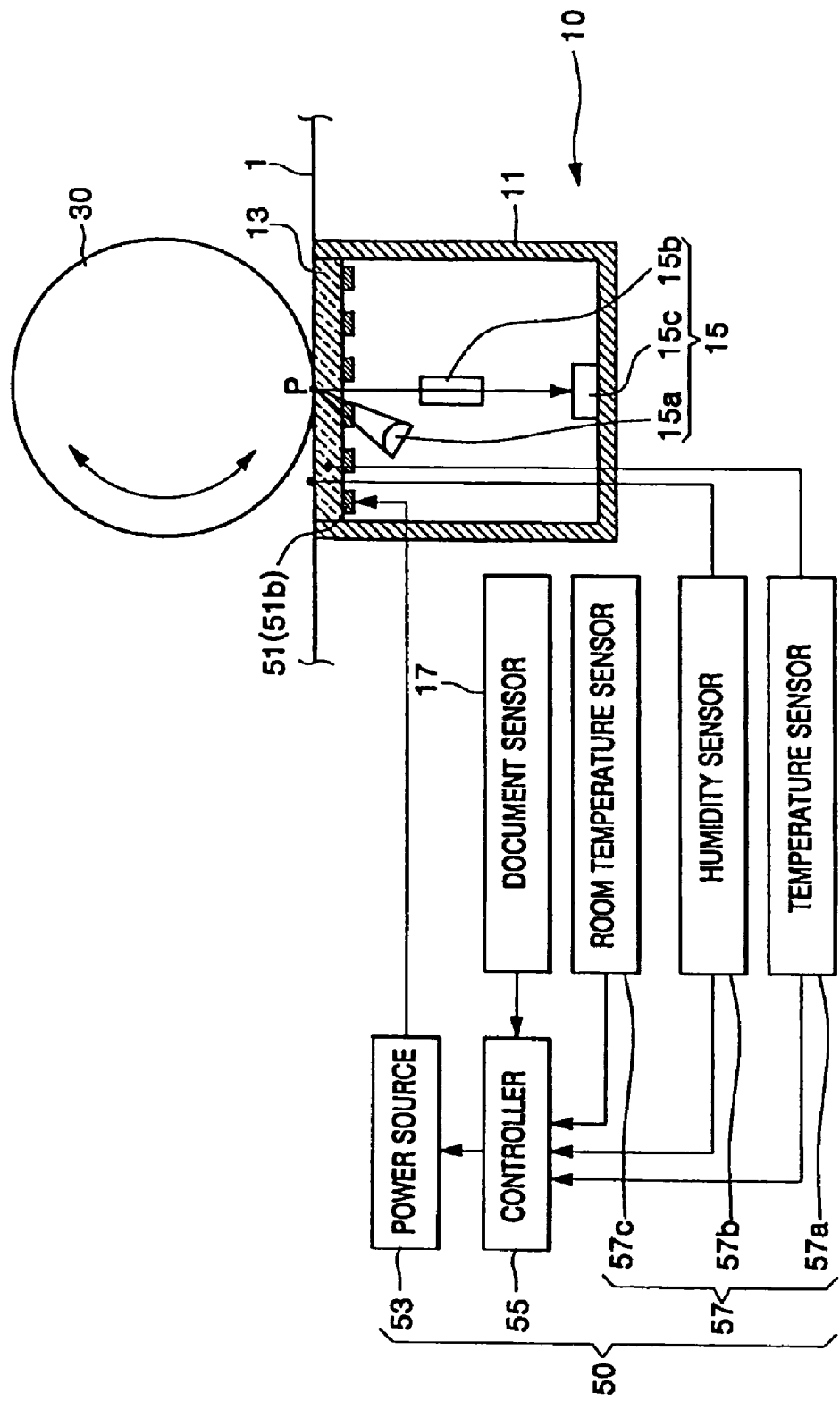
FIG. 3 is a cross-sectional view of a transparent plane heater used as a heater.

Meanwhile, FIG. 3 illustrates a transparent heater 51b used as the heater 51, by way of example. Referring to FIG. 3, the heater 51 may include the transparent heater 51b. In this case, the transparent heater 51b does not interfere with the read-out unit 15, so the transparent heater 51b can be coated on the inner surface of the document glass 13 at predetermined intervals regardless of its position. The transparent heater 51b may include a material having a good conductivity and keeping transparency, for example, indium oxide, zinc oxide, tin oxide, etc. The above materials are naturally transparent enough so as not to interfere with the read-out unit 15.

Further, the heater 51 can be a conductor having a resistance R and generating heat when electric current flows therein. For example, the heater 51 can have a resistance R of 100Ω or more.

In the foregoing description, the heater 51 is provided in the document glass 13 and directly heats the document glass 13. However, the heater 51 may be strategically placed so as to indirectly heat the document glass 13.

Figure 4:
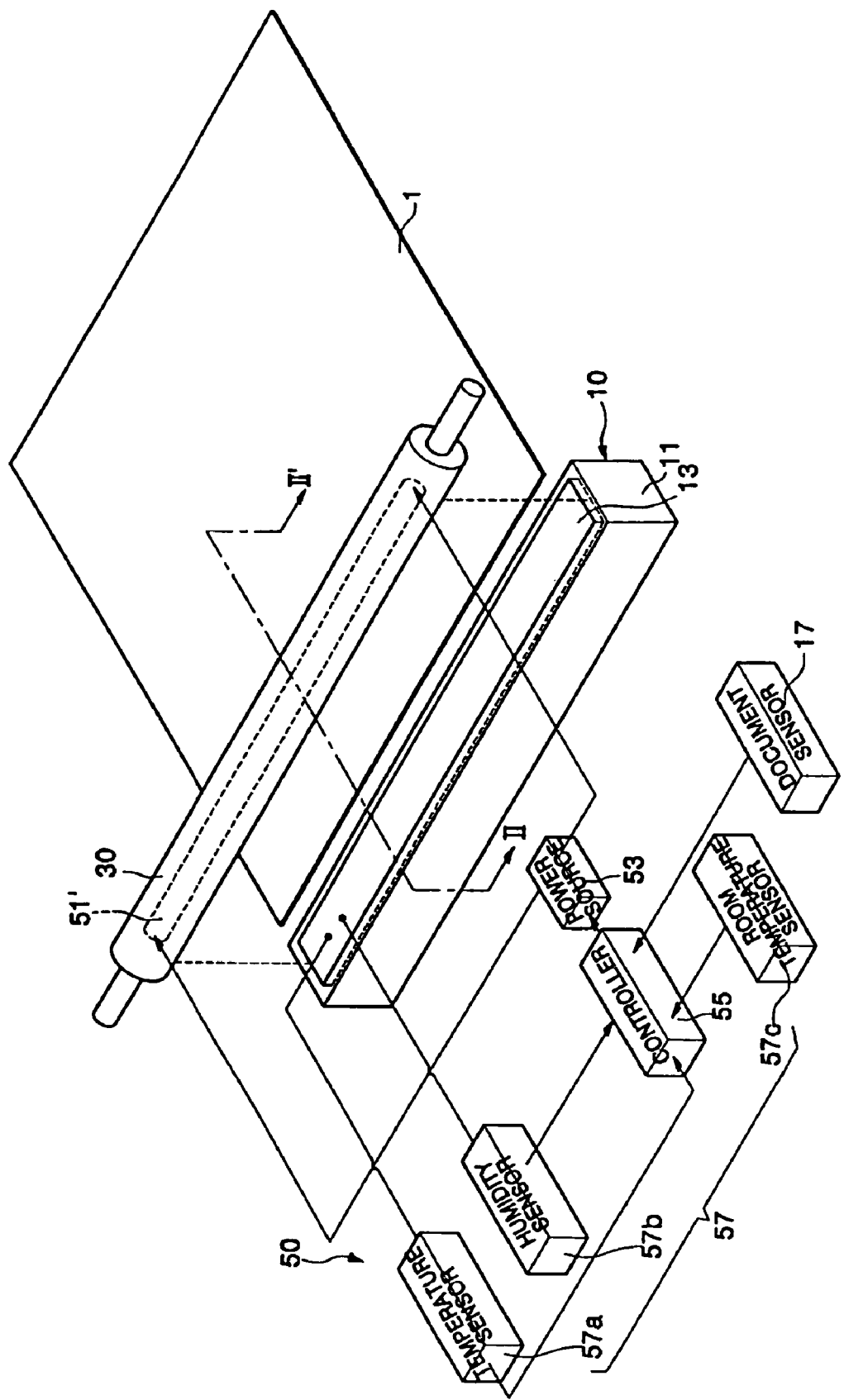
FIG. 4 is a perspective view of a heater provided in a pressing roller according to another embodiment of the present general inventive concept.
Figure 5:
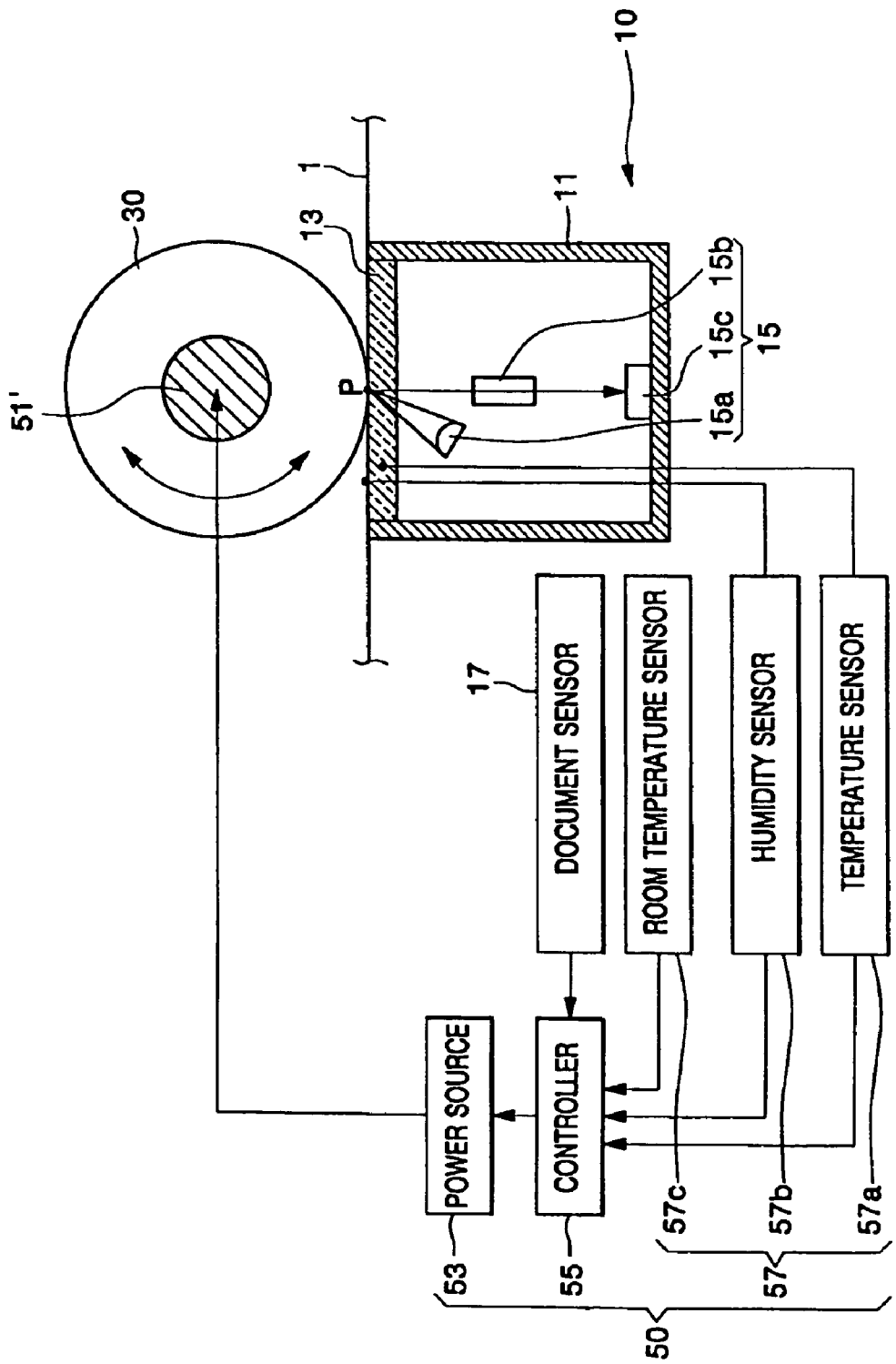
FIG. 5 is a cross-sectional view of the image read-out apparatus of FIG. 4, taken along a line II-II'.

FIG. 4 illustrates a heater 51' provided in the pressing roller 30, and FIG. 5 is a cross-sectional view taken along the line II-II' of FIG. 4.

Referring to FIGS. 4 and 5, the heater 51' is provided in the pressing roller 30 and indirectly heats the document glass 13 in contrast with the heater 51 of FIGS. 1 and 2 provided in the document glass 13 and directly heats the document glass 13.

In this embodiment, like numbers as in FIG. 1 refer to like elements, and their detailed descriptions will therefore be omitted. Referring to FIGS. 4 and 5, the heater 51' operates on the same principle as the heater 51 of FIGS. 1 and 2.

Hereinafter, a description will be made about a method of removing the moisture using the moisture removal unit 50 of an image read-out apparatus configured as described above.

When a user instructs the image read-out apparatus to read out an image, the document glass 13 is heated at a predetermined temperature to remove the moisture of the document glass 13 before the CIS 10 starts reading out the image.

Figure 6:
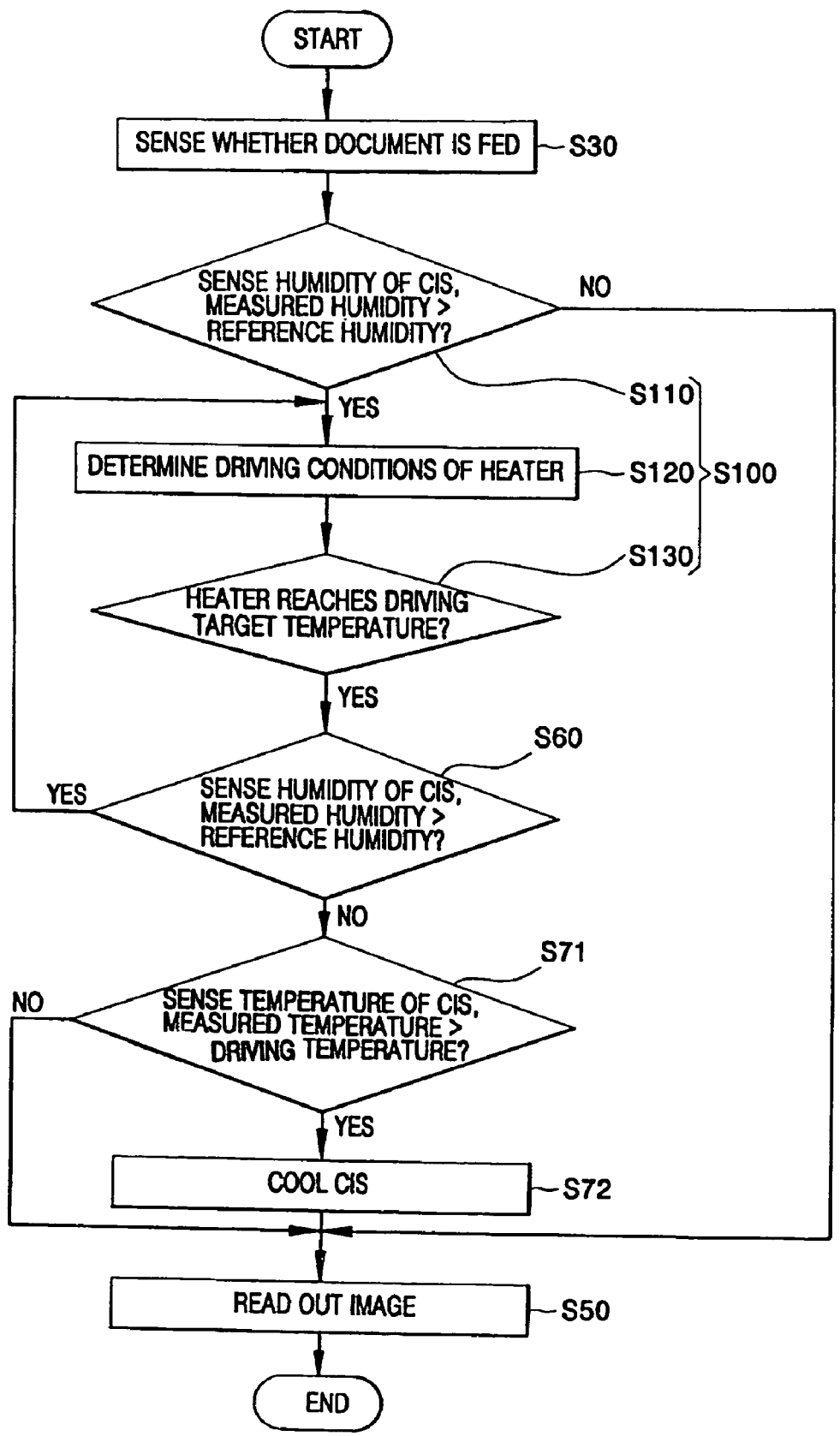
FIG. 6 is a flowchart illustrating a process of removing moisture through a humidity sensor of the moisture removal apparatus of FIG. 1.

FIG. 6 is a flowchart illustrating a process of removing the moisture through the humidity sensor 57b of the moisture removal unit 50.

Referring to FIG. 6, a method of reading out an image can include sensing whether the document 1 is fed, at operation S30, removing the moisture, at operation S100, and reading out an image, at operation S50.

In the operation S30 of sensing whether the document 1 is fed, the document 1 can be fed into the document feeder, and an automatic feeding unit can transfer the document 1 sheet by sheet. At this time, the document sensor 17 senses whether the document 1 is fed. When the document 1 is sensed, the document 1 can be placed in a standby state. The standby state can be maintained in order to get either a facsimile number input by a user when the user intends for facsimile transmission, or an instruction of conditions, etc., which the user requires in order to copy or scan the document.

Here, a signal from the document sensor 17 can play an important role in determining whether the operation S100 of removing the moisture is performed or not. That is, when the document is not sensed by the document sensor 17, the operation S100 of removing the moisture is not performed. This is to prevent the operation S100 of removing the moisture from being unnecessarily performed in a state in which the document 1 is not fed.

Consequently, the operation S100 of removing the moisture can be performed while the document is maintained in the standby state as set forth above, and its detailed process is as follows.

The operation S100 of removing the moisture can include sensing the humidity of the surface of the document glass 13 of the CIS 10, at operation S110, determining the driving conditions of the heater 51 when a value of the sensed humidity is greater than a value of a reference humidity, at operation S120, and driving the heater 51 on the basis of the determined driving conditions of the heater 51 and checking whether the heater 51 reaches a driving target temperature, at operation S130.

Here, the driving conditions of the heater 51 can be determined by tabulating values of the target temperatures to drive the heater 51 corresponding to the value of the humidity sensed in operation S110. Then, the corresponding driving condition can be adapted to be applied.

TABLE 1

| Condition | Mode | | | | | | |
| --- | --- | --- | --- | --- | --- | --- | --- |
|  | A | B | C | D | E | F | ... |
| Temperature T (° C.) | 25 | 30 | 35 | 40 | 45 | 50 | ... |
| Humidity H (%) | 35 | 40 | 45 | 50 | 55 | 60 | ... |
| Maintaining Time | 0.1 | 0.2 | 0.3 | 0.4 | 0.5 | 0.5 | ... |

Table 1 shows an example of a table to determine the driving conditions. A detailed description will be made about a process of determining the driving conditions.

When the humidity sensed in the operation S110 is 35%, the controller 55 can select the driving mode "A" in the determination table of Table 1 and transmit a driving signal to the heater 51. In mode "A", the heater 51 is heated at the target temperature of 25° C. to remove the moisture. Further, the temperature of 25° C. is maintained for a time of 0.1 second, to thereby completely remove the moisture. Here, a maintaining time is required to exclude a possibility that the moisture is formed on the surface of the document glass 13 again due to a temperature difference between the document read-out apparatus and its surroundings even though the temperature of the heater 51 reaches the target temperature of 25° C.

TABLE 2

| Humidity (%) | Temperature(° C.) | | | | | | |
|---|---|---|---|---|---|---|---|
| | 25 | 30 | 40 | 45 | 50 | 55 | ... |
| 35 | 1 | 2 | 3 | 4 | 5 | 6 | ... |
| 40 | a | b | c | d | e | f | ... |
| 45 | α | β | γ | δ | ε | ζ | ... |
| . | . | . | . | . | . | . | ... |
| . | . | . | . | . | . | . | ... |
| . | . | . | . | . | . | . | ... |

Table 1, the determination table, is simply one example, and, as shown in Table 2, a value of target temperature corresponding to the sensed humidity may be variously changed and applied. For example, when the sensed humidity is 35%, the target temperature is not limited to 25° C., as shown in Table 1, but may be set to 30° C., 40° C. or so forth, as shown in Table 2.

In order to ensure that the moisture is completely removed, an operation S60 of rechecking the humidity of the surface of the document glass 13 of the CIS 10 after the moisture is removed through the operations S120 and S130 can be performed, and the operations S120 and S130 can be repeated when the rechecked humidity exceeds the reference humidity.

While the heater 51 generates heat to remove the moisture, the temperature of the CIS 10 may exceed the driving temperature. To solve this problem, the temperature of the CIS 10 can be sensed by the temperature sensor 57a, at operation S71. When the temperature of the CIS 10 is greater than the driving temperature, the CIS 10 can be cooled, at operation S72.

When the CIS 10 is cooled down to the driving temperature, the document 1 maintained in the standby state can be fed to the CIS 10, thereby performing the operation S50 of reading out the image.

Hereinafter, a description will be made about a method of removing the moisture by sensing a moisture state of the document glass 13 through the room temperature sensor 57c, and then determining the driving conditions of the heater 51 according to the sensed moisture state.

Figure 7:
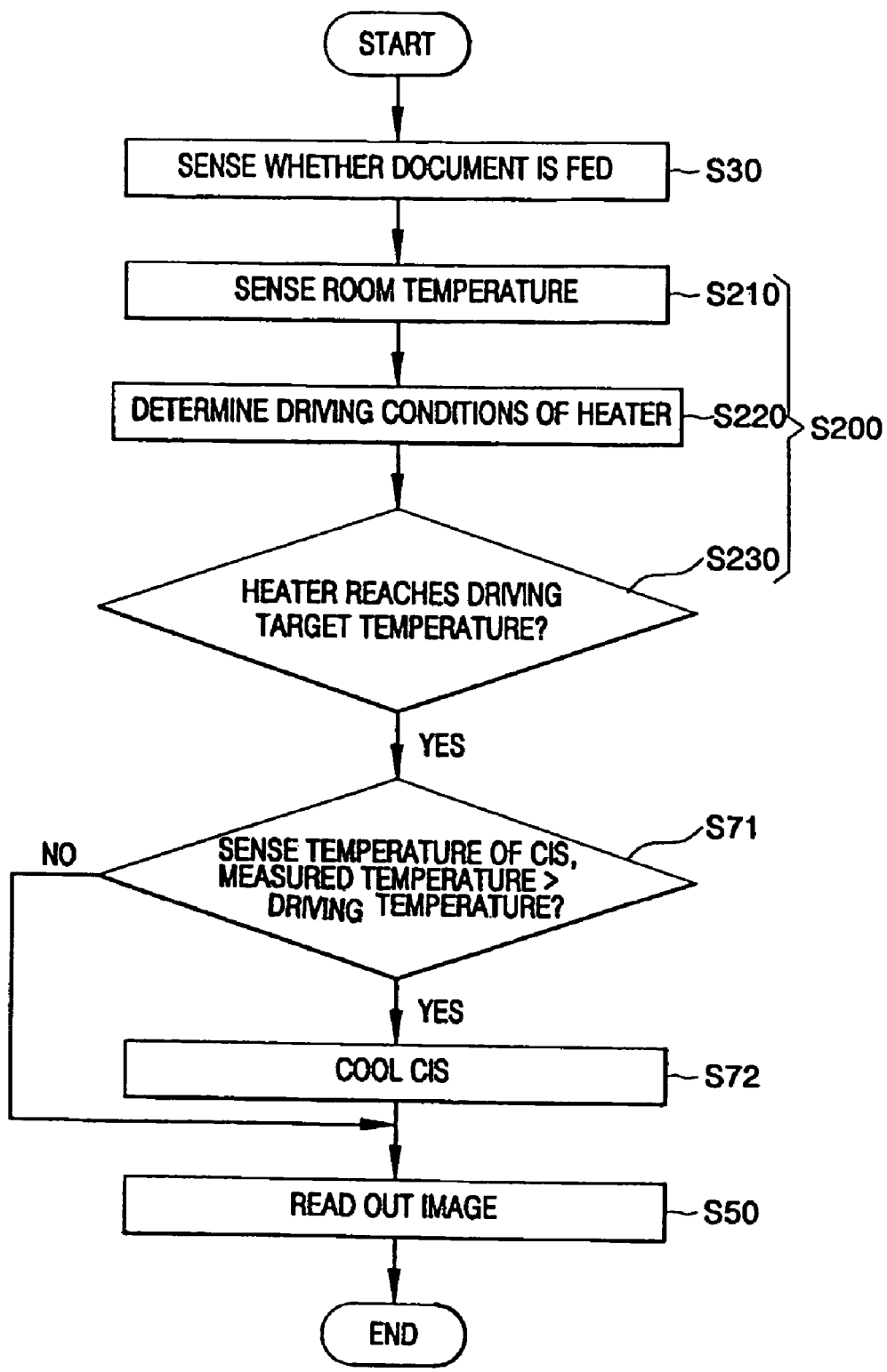
FIG. 7 is a flowchart illustrating a process of removing moisture on the basis of a room temperature sensed by the moisture removal apparatus of FIG. 1.

FIG. 7 is a flowchart illustrating the process of removing moisture on the basis of the room temperature sensor 57 of the moisture removing unit 50.

Referring to FIG. 7, a process of reading out an image can include the operation S30 of sensing whether the document 1 is fed, and the operation S50 of reading out the image, similarly to FIG. 6. Therefore, like numbers as to FIG. 6 refer to like operations, and their detailed descriptions will be omitted.

Hereinafter, an operation S200 of removing the moisture, different from the operation S100 shown in FIG. 6, will be described in more detail.

The operation S200 of removing the moisture from the document glass can include sensing a room temperature through the room temperature sensor 57c, which can be mounted to the image read-out apparatus, at operation S210, determining the driving conditions of the heater 51 according to the room temperature sensed in the operation S210, at operation S220, and driving the heater 51 according to data determined in the operation S220 and checking whether the heater 51 reaches a driving target temperature, at operation S230.

In the operation S220, the target temperature value to remove the moisture according to the sensed room temperature can be tabulated, and then the corresponding driving condition can be adapted to be applied.

TABLE 3

| Temperature (° C.) | Heating operation | | | Target temperature (° C.) |
|---|---|---|---|---|
| | Table | Approaching speed | Maintaining time | |
| 10 | A | 1500 ms | 5 | 65 |
| 15 | B | 1200 ms | 3 | 60 |
| 20 | C | 1000 ms | 1 | 55 |
| 25 | D | 700 ms | 1 | 50 |
| 30 | E | 500 ms | — | 45 |
| 35 | F | 300 ms | 0.5 | 45 |
| 40 | G | 100 ms | — | 45 |

Table 3 shows one example of tabulating the target temperature according to the room temperature to determine the driving conditions.

For example, as shown in Table 3, when the room temperature sensed by the room temperature sensor 57c is 10° C., the target temperature to remove the moisture can be 65° C., and the approaching speed for the target temperature can be 1500 ms (millisecond). Further, the temperature of 65° C. can be maintained for 5 seconds, to thereby completely remove the moisture. In this manner, the reason the maintaining time is required is based on the same reason as described with reference to FIG. 6.

In the process of removing the moisture through the room temperature sensor 57c as described above, the heater 51 is heated to increase the temperature of the CIS 10 in order to remove the moisture. Thus, the temperature of the CIS 10 can be measured by the temperature sensor 57a at the operation S71, and the operation S72 of cooling the CIS 10 can be additionally provided when the temperature of the CIS 10 is greater than the driving temperature.

Hereinafter, a description will be made regarding a method of removing the moisture by sensing a moisture state of the document glass 13 through the temperature sensor 57a, and determining the driving conditions of the heater 51 according to the sensed moisture state.

Figure 8:
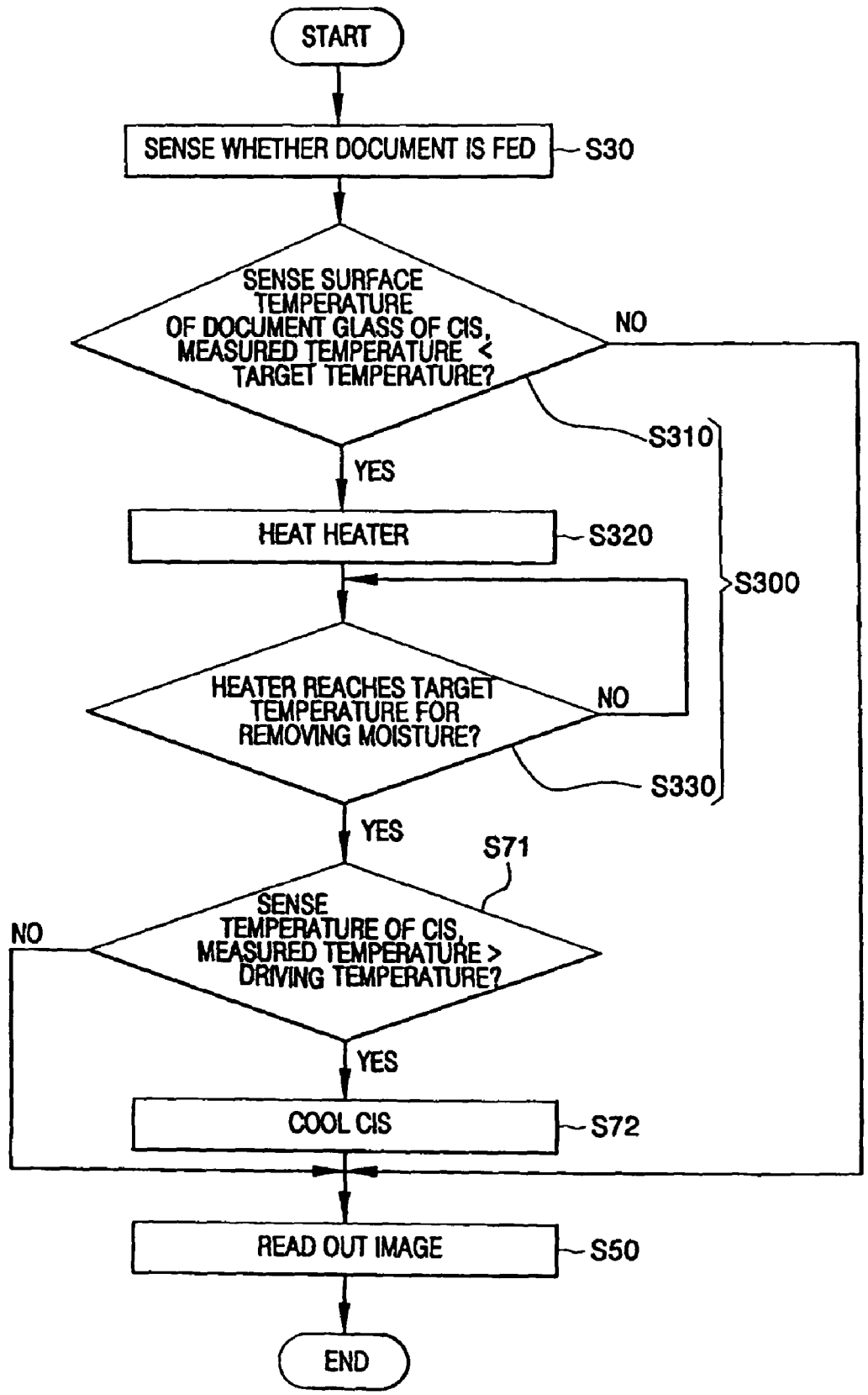
FIG. 8 is a flowchart illustrating a process of removing moisture through a temperature sensor of the moisture removal apparatus of FIG. 1.

FIG. 8 is a flowchart illustrating the process of removing the moisture through the temperature sensor 57a of the moisture removing unit 50.

Referring to FIG. 8, a method of reading out an image can include the operation S30 of sensing whether the document 1 is fed, and the operation S50 of reading out the image, similarly to FIG. 6. Therefore, like numbers as to FIG. 6 refer to like operations, and their detailed descriptions will be omitted.

Hereinafter, an operation S300 of removing the moisture, different from the operation S100 shown in FIG. 6, will be described in more detail.

The operation S300 of removing the moisture can include sensing the surface temperature of the document glass 13 of the CIS 10 through the temperature sensor 57a, at operation S310, driving the heater 51 until its temperature reaches a target temperature corresponding to the temperature sensed in the operation S310, at operation S320, and determining whether the temperature of the heater 51 reaches the target temperature to remove the moisture, at operation S330.

When the surface temperature of the document glass 13 reaches the target temperature to remove the moisture in the operation S320, the heater can maintain the target temperature for a predetermined amount of time, and the document glass 13 can maintain a constant temperature to thereby remove the moisture completely.

As described above, in the process of removing the moisture through the temperature sensor 57a, the heater 51 is heated in order to remove the moisture, and the CIS 10 may exceed the driving temperature. In this case, the operation S72 of cooling the CIS 10 can be additionally provided, when the temperature of the CIS 10 is measured through the temperature sensor 57a at the operation S71 and the measured temperature exceeds the driving temperature.

As described above, the operations of removing the moisture through various sensing units 57a, 57b and 57c may be performed either prior to reading out the image or during the reading out of the image in periods.

As described above, the present general inventive concept provides an advantage in that a document glass is directly or indirectly heated to remove moisture formed thereon, and a document is smoothly transferred without adhering to a surface of the document glass.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A moisture removal apparatus usable with an image read-out apparatus, in which the image read-out apparatus includes a contact image sensor (CIS) provided with a document glass on which a document is put on an upper portion thereof and a read-out unit to read out an image of the document, and a pressing roller rotatably provided in contact with a top surface of the CIS to transfer the document, the moisture removal apparatus comprising:
    a heater to heat the document glass to a predetermined temperature to remove moisture therefrom;
    a power source to apply a predetermined voltage to the heater;
    a sensing unit to acquire information indicative of an ambient condition in or around the CIS that affect formation of moisture thereat; and
    a controller to control the voltage provided by the power source to the heater responsive to the information provided by the sensing unit.

2. The moisture removal apparatus as claimed in claim 1, wherein the heater is provided in the document glass.

3. The moisture removal apparatus as claimed in claim 2, wherein the heater is coated on an inner surface of the document glass.

4. The moisture removal apparatus as claimed in claim 3, wherein the heater is formed of a material including at least one of indium oxide, zinc oxide, and tin oxide.

5. The moisture removal apparatus as claimed in claim 2, wherein the heater is disposed at an edge of the document glass.

6. The moisture removal apparatus as claimed in claim 1, wherein the heater is provided in the pressing roller.

7. The moisture removal apparatus as claimed in claim 1, wherein the sensing unit comprises a room temperature sensor mounted to the image read-out apparatus to sense a room temperature as the ambient condition.

8. The moisture removal apparatus as claimed in claim 1, wherein the sensing unit comprises a humidity sensor to sense a humidity of a surface of the document glass as the ambient condition.

9. The moisture removal apparatus as claimed in claim 1, wherein the sensing unit comprises a temperature sensor to sense a temperature of the document glass as the ambient condition.

10. The moisture removal apparatus as claimed in claim 9, wherein the temperature sensor determines whether the temperature of the document glass exceeds a driving temperature of the CIS.

11. The moisture removal apparatus as claimed in claim 9, wherein the temperature sensor senses a surface temperature of the document glass.

12. The moisture removal apparatus as claimed in claim 1, further comprising a document sensor coupled to the controller to sense whether the document is fed into a document feeder of the image read-out apparatus such that the control of the voltage to the heater is performed only upon a positive determination by the document sensor that the document has been fed into the document feeder.

13. An image read-out apparatus comprising:
    a contact image sensor (CIS) including a document glass;
    a pressing roller to transfer a document over a surface of the document glass; and
    a moisture removal unit to determine an ambient condition in or around the CIS that affect a moisture level on the document glass and to apply a predetermined amount of heat for a predetermined amount of time to the document glass based on the determined moisture level.

14. The image read-out apparatus as claimed in claim 13, wherein the moisture removal unit senses a room temperature as the ambient condition and determines the moisture level based on the sensed room temperature.

15. The image read-out apparatus as claimed in claim 13, further comprising a temperature sensor to sense a temperature of the CIS, wherein the document is not transferred when the temperature of the CIS exceeds a predetermined reference temperature.

16. The image read-out apparatus as claimed in claim 13, wherein the moisture removal unit includes a heater in the pressing roller to apply the predetermined amount of heat to the document glass.

17. The image read-out apparatus as claimed in claim 13, wherein the moisture removal unit comprises a heater provided in the document glass.

18. The image read-out apparatus as claimed in claim 17, wherein the heater is coated on a surface of the document glass.

19. An image read-out apparatus comprising:
    a contact image sensor (CIS) including a document glass to place a document thereon and an image read-out unit to read out an image from the document;
    a pressing roller to transfer the document with respect to the document glass; and
    a heating unit disposed in the pressing roller to heat the document glass to remove moisture therefrom.

20. The image read-out unit as claimed in claim 19, further comprising a sensing unit to sense a state of the CIS, wherein the heating unit heats the document glass based on the sensed state of the CIS.

21. A moisture removal method of an image read-out apparatus, the method comprising:
    sensing whether a document is fed into a document feeder;

sensing a relative humidity at a top surface of a document glass of a contact image sensor (CIS) upon a positive determination that the document is fed into a document feeder;

determining driving conditions of a heater to heat the document glass according to the sensed humidity; and driving the heater according to the driving conditions to remove the moisture.

22. The moisture removal method as claimed in claim 21, wherein the driving conditions of the heater are determined by selecting a target temperature of the heater corresponding to the sensed humidity.

23. The moisture removal method as claimed in claim 22, wherein the driving of the heater comprises maintaining substantially the target temperature at the heater for a predetermined amount of time when the heater reaches the target temperature.

24. The moisture removal method as claimed in claim 21, further comprising:

re-sensing the humidity of the top surface of the document glass after the driving of the heater to determine the driving conditions of the heater upon a positive determination that the re-sensed humidity exceeds a reference humidity;

driving the heater according to the driving conditions corresponding to the re-sensed humidity; and repeating the re-sensing of the humidity and the driving of the heater to remove the moisture.

25. The moisture removal method as claimed in claim 21, further comprising:

determining a temperature of the CIS after the driving of the heater; and cooling the CIS to a driving temperature of the CIS when the determined temperature exceeds the driving temperature of the CIS.

26. A moisture removal method of an image read-out apparatus, the method comprising:

sensing whether a document is fed into a document feeder;

sensing a room temperature in the image read-out apparatus upon a positive determination that the document is fed into a document feeder;

determining driving conditions of a heater to heat a document glass of a contact image sensor (CIS) according to the sensed room temperature; and driving the heater according to the driving conditions to remove the moisture.

27. The moisture removal method as claimed in claim 26, wherein the driving conditions of the heater are determined by selecting a target temperature of the heater corresponding to the sensed room temperature.

28. The moisture removal method as claimed in claim 27, wherein the driving of the heater comprises maintaining substantially the target temperature at the heater for a predetermined amount of time when the heater reaches the target temperature.

29. The moisture removal method as claimed in claim 26, further comprising:

determining a temperature of the CIS after removing the moisture; and cooling the CIS to a driving temperature thereof when the determined temperature exceeds the driving temperature of the CIS.

30. A moisture removal method for an image read-out apparatus, the method comprising:

sensing whether a document is fed into a document feeder;

sensing a surface temperature of a document glass of a contact image sensor (CIS) upon a positive determination that the document is, fed into, a document feeder;

driving a heater until the heater reaches a predetermined target temperature corresponding to the sensed temperature; and determining whether the heater reaches the target temperature.

31. The moisture removal method as claimed in claim 30, wherein the driving of the heater comprises maintaining substantially the target temperature at the heater for a predetermined amount of time when the heater reaches the target temperature.

32. The moisture removal method as claimed in claim 30, further comprising:

determining the surface temperature of the CIS after the driving of the heater; and cooling the CIS to a driving temperature thereof when the determined temperature exceeds the driving temperature of the CIS.

33. A moisture removal method of an image read-out apparatus, the method comprising:

sensing an in situ state of a contact image scanner (CIS) of the image read-out apparatus; and heating a document glass of the CIS to a temperature corresponding to the sensed state to remove moisture.

34. The method as claimed in claim 33, wherein the heating of the document glass comprises:

determining driving conditions of a heater according to the sensed state of the CIS; and driving the heater according to the determined driving conditions of the heater.

35. The method as claimed in claim 34, wherein the sensing of the state of the CIS comprises:

sensing a humidity of the document glass of the CIS.

36. The method as claimed in claim 34, wherein the sensing of the state of the CIS comprises:

sensing a room temperature surrounding the CIS.

37. The method as claimed in claim 34, wherein the sensing of the state of the CIS comprises:

sensing of a temperature of the document glass of the CIS.

38. The method as claimed in claim 34, wherein the sensing of the state of the CIS comprises:

sensing of a surface temperature of the CIS.

39. The method as claimed in claim 34, wherein the determining of the driving conditions comprise:

determining a target temperature of the heater; and determining a maintaining time of the target temperature of the heater.

40. The method as claimed in claim 39, wherein the driving of the heater comprises:

driving the heater until the heater reaches the target temperature; and maintaining the target temperature at the heater over the maintaining time.

41. The method as claimed in claim 33, further comprising:

determining a temperature of the CIS after the heating of the document glass; and cooling the CIS to a driving temperature thereof when the determined temperature of the CIS exceeds the driving temperature.

* * * * *